United States Patent [19]
Reinhoudt

[11] 3,724,918
[45] Apr. 3, 1973

[54] BEARING
[75] Inventor: Jacobus Pieter Reinhoudt, Emmasingel, Eindhoven, Netherlands
[73] Assignee: U.S. Philips Corporation, New York, N.Y.
[22] Filed: Oct. 1, 1971
[21] Appl. No.: 185,838

Related U.S. Application Data
[62] Division of Ser. No. 23,303, March 27, 1970, abandoned.

[30] Foreign Application Priority Data
Apr. 5, 1969 Netherlands..................6905357

[52] U.S. Cl..................................308/109
[51] Int. Cl..................................F16c 33/66
[58] Field of Search........................308/109–114

[56] References Cited
UNITED STATES PATENTS
3,510,179  5/1970  Larson..................308/114

Primary Examiner—Charles J. Myhre
Assistant Examiner—Frank Susko
Attorney—Frank R. Trifari

[57] ABSTRACT

A bearing comprising a shaft and a bush one of which forms a rotatable bearing member. A chamber for a lubricant is situated in the rotatable bearing member and the lubricant is forced to the bearing gap under the influence of centrifugal force. The part of the storage chamber facing the center line of the shaft is in open communication with the outside of the bearing so as to prevent negative pressure in the storage chamber when lubricant is transported to the bearing gap.

7 Claims, 6 Drawing Figures

PATENTED APR 3 1973

INVENTOR.
JACOBUS P. REINHOUDT

BY

AGENT

INVENTOR.
JACOBUS P. REINHOUDT

BY

AGENT

BEARING

CROSS REFERENCE

This is a division of Applicant's application Ser. No. 23,303, filed Mar. 27, 1970, now abandoned.

The invention relates generally to bearings and particularly to a bearing comprising a shaft and a bush one of which is rotatable and the other of which is stationary, the rotatable member being provided with a storage chamber for lubricant.

Bearings provided with a storage chamber for a lubricant, for example, grease or oil, in the rotatable part of the shaft of a bearing are known. The lubricant being forced in a direction remote from the shaft as a result of the centrifugal force when it is rotated. In this known construction the lubricant contacts spiral pumping grooves which force the lubricant between the cooperating bearing surfaces situated on one side of the storage chamber. If lubricant flows out of the storage chamber, a negative pressure is formed in the part of the storage chamber situated near the center line of the shaft, which negative pressure can prevent further supply of lubricant to the bearing.

It is an object of the invention to provide a bearing in which these difficulties are avoided so that a sufficient supply of lubricant to the bearing gap is always guaranteed. In order to achieve this, according to the invention, an open communication is provided between the part of the storage chamber directed towards the center line of the shaft and the atmosphere outside the bearing. Detrition of the bearing as a result of insufficient supply of lubrican is thereby prevented.

In known bearings having a storage chamber for the lubricant, sealing members are provided on the side remote from the cooperating bearing surfaces, so as to prevent leakage of lubricant during operation to the outside. In order to avoid excessive frictional losses, these sealing members are preferably constructed as spiral pumping grooves which have a pumping action in the direction of the storage chamber. In certain cases, however, it can be difficult with said pumping grooves to entirely avoid leakage of lubricant. In order to absolutely avoid leakage of lubricant during operation, the side of the storage chamber remote from the bearing surfaces, in a preferred embodiment according to the invention, consists of a flange which is present on the bush and extends to near the shaft but permits an open communication with the outside of the bearing. Such a bearing is intended for continuous operation. Both the supply, if any, of lubricant to the bearing gap and the seal are obtained by means of the centrifugal force.

The storage chamber, in a further embodiment according to the invention, is formed between the flange and a thickened part of the shaft, at least a portion of the thickened part of the shaft forming one of the bearing surfaces.

In another embodiment according to the invention, the shaft comprises a flange-shaped part in which the storage chamber is formed between the flange of the bush and the flange-shaped part of the shaft and in which a pattern of spiral grooves is provided on said flange-shaped part of the shaft or on the part of the bush situated opposite thereto, said pattern forcing lubricant in the direction of the cooperating bearing surfaces upon rotation of the rotatable bearing member.

It may furthermore be of advantage if, according to the invention, the shaft comprises a flange-shaped part and the storage chamber is situated between two flanges in the bush one of which adjoins the flange-shaped part of the shaft, at least one apertures for passing the lubricant to the bearing surfaces being present in said flange at a place remote from the shaft, a pattern of spiral grooves being present on the flange-shaped part of the shaft or on the part of the bush situated opposite thereto, which grooves force lubricant in the direction of the cooperating bearing surfaces upon rotation of the rotatable bearing member.

In the examples described the bush is the rotatable bearing member. However, the shaft may alternatively be chosen to be the rotatable bearing member in which case, an annular storage chamber is secured to the shaft. Lubricant is carried in the chamber for the bearing surfaces and an aperture is present on the side remote from the shaft and near the end of the flange. In a recess of the bush a member is provided which is angular in cross-section and of which one of the limbs forms a flange extending to a point near the shaft. A pattern of spiral grooves is also present on the outside of the annular storage chamber or on the part of the bush situated opposite thereto, which grooves force lubricant in the direction of the cooperating bearing surfaces upon rotation of the shaft.

According to the invention, both the annular storage member and the member which is angular in cross-section may consist of a synthetic material.

The storage chamber may also be provided in the shaft. This storage chamber communicates with the outside of the bearing through an aperture.

In order that the invention may be readily carried into effect, a few embodiments thereof will now be described in greater detail, by way of example, with reference to the accompanying drawings, in which FIG. 1 shows a first embodiment of the bearing in which the bush is rotatable.

Figure 1:
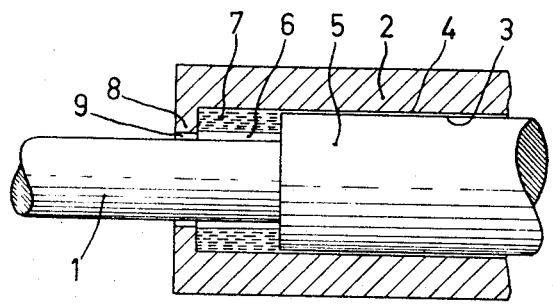

FIG. 1 shows a part of a bearing having a shaft 1 and a bush 2. The cooperating bearing surfaces are denoted by 3 and 4, respectively, bearing surface 3 being situated on a thickened portion 5 of the shaft. A storage chamber 6 for a lubricant 7, for example, grease or oil, is formed between the thin shaft portion 1 and the bush 2. This chamber 6 is bounded on one side by a flange 8 of the bush 2, which flange leaves an open communication 9 between the chamber and the outside of the bearing.

When the bush 2 rotates, the lubricant will be forced in a direction remote from the shaft as a result of the centrifugal force so that the bearing gap between the bearing surfaces 3 and 4 will always remain filled with lubricant. As a result of the open communication 9, no negative pressure can be formed in the storage chamber 6 even when lubricant flows out of the storage chamber to the bearing gap. So a supply of lubricant to the bearing gap is always ensured so that detrition or jamming of the bearing is absolutely prevented.

The bearing shown in FIG. 1, and also the bearings shown in the further figures, are preferably used for continuous rotation. Although no seal is present between the chamber 6 and the outside of the bearing, any leakage of lubricant to the outside of the bearing is excluded due to the favorable shape and the centrifugal action on the lubricant. Therefore the bearing can remain in operation for a very prolonged period of time by means of the quantity of lubricant provided in the chamber at the onset. When a grease is used as a lubricant, discontinuous operation without after-lubrication is also possible without leakage occurring.

Figure 2:
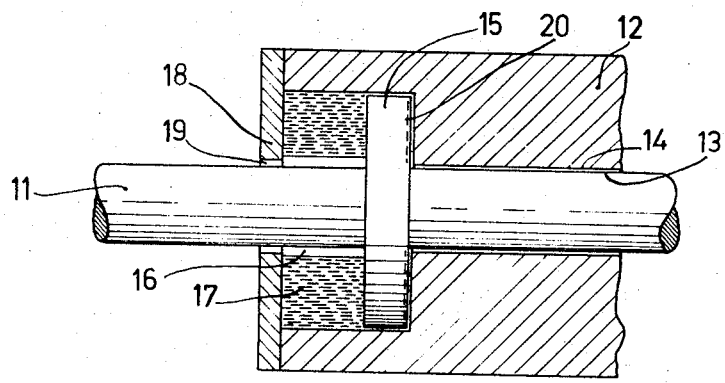
FIGS. 2 and 3 show a part of bearings having rotatable bushes in which the storage chamber is situated

FIG. 2 shows an embodiment in which a larger storage chamber for the lubricant is present. For that purpose, the shaft 11 is provided with a flange 15. A flange 18 which is secured to the bush 12, for example, by means of bolts (not shown) has an open communication 19 from the storage chamber 16 to the outside of the bearing. Upon rotation of the bush 12, the lubricant is forced in the direction remote from the shaft as a result of the centrifugal force. Shallow spiral grooves 20 are provided on the flange 15, which grooves are shown diagrammatically only and exert a pumping action on the lubricant in the direction of the bearing gap between the cooperating bearing surfaces 13 and 14. The operation of this bearing is similar to the bearing described in FIG. 1. As a result of the larger storage chamber, this bearing can remain operative for an even longer period of time without replenishment of the lubricant.

Figure 3:
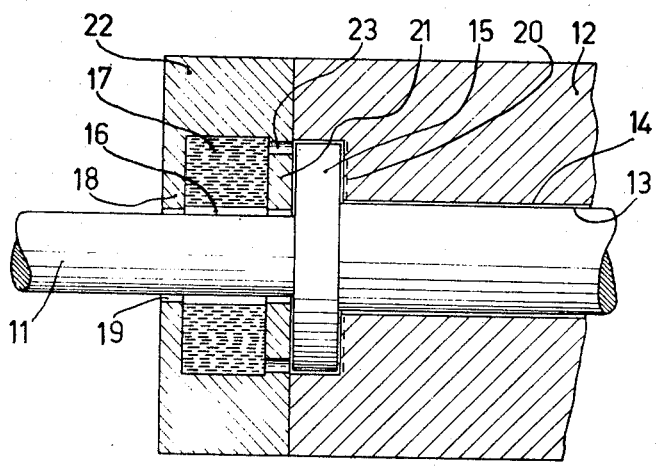

FIG. 3 shows a bearing which is very similar to the bearing shown in FIG. 2, and in which like parts are designated by the same reference numerals. In this embodiment, however, the storage chamber 16 is formed between two flanges 18 and 21 of a member 22 connected to the bush 12. An aperture 23 through which the lubricant 17 can be forced in the direction of the bearing surfaces 13 and 14 is provided in the flange 21. The spiral pumping groove 20 in the embodiment shown are provided in the bush 12 instead of the flange 15 as in FIG. 2; this makes no difference for the pumping action.

Figure 4:
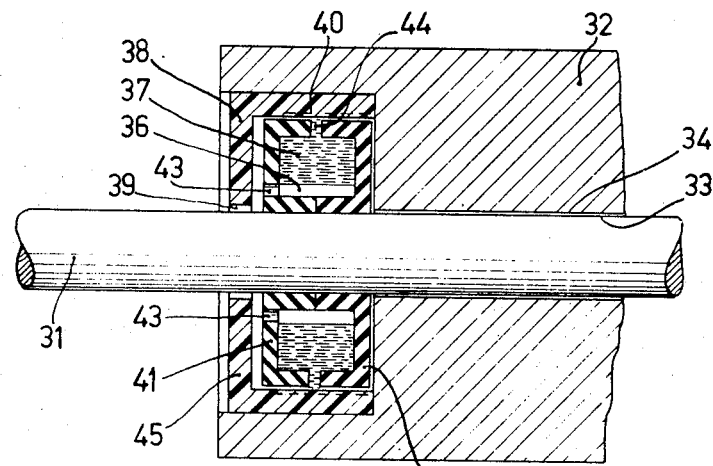
FIG. 4 shows a part of a bearing in which the shaft is rotatable and the storage chamber consists of an annular element present on the shaft.
Figure 5:
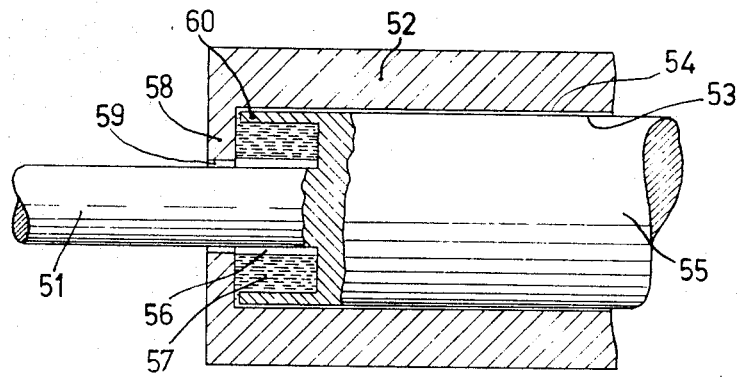
FIGS. 5 and 6 show further embodiments of a bearing having a rotatable shaft.
Figure 6:
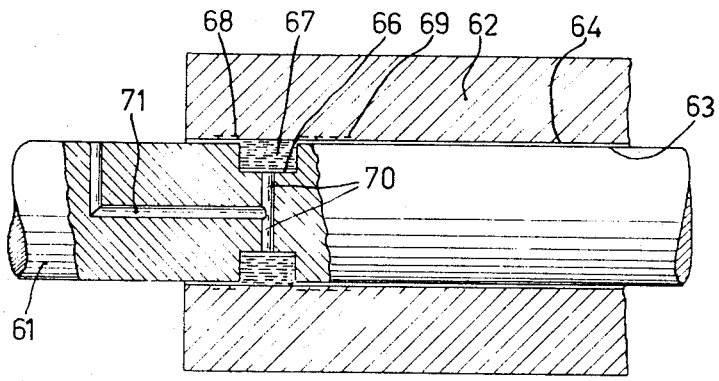

The embodiments to be described with reference to FIGS. 4, 5 and 6 are intended for use in a bearing in which the shaft rotates in contrast with the embodiments shown in FIGS. 1 to 3 in which the bush is rotatable.

In the embodiment shown in FIG. 4 two annular parts 41 and 42 are slid on the shaft 31 so as to be clamped thereon. The annular parts 41 and 42, which are made of a synthetic material, form a storage chamber 36 containing the lubricant 37. One or more bores 43 are provided in the part 41 near the shaft; on the outside of the annular parts a gap 44 is formed. In a recess of the bush 32 a member 45 which is angular in cross-section is provided, which is also preferably made of a synthetic material. A flange 38 of the said member 45 leaves an open communication 39.

Upon rotation of the shaft 31, the lubricant 37 is forced to the gap 44 as a result of the centrifugal force. If there exists a lack of lubricant in the bearing gap, replenishment of lubricant from the storage chamber occurs. Spiral transport grooves 40 also ensure the supply of lubricant to the bearing surfaces 33 and 34. The part of the transport grooves present on the ring 41 serves as an extra seal of lubricant. As a result of the open communication 39 and the bore 43 no negative pressure can be formed in the chamber 36 when lubricant is transported away so that a good supply of lubricant to the bearings gap is ensured.

FIG. 5 shows an embodiment in which a shaft 51 has a thickened part 55. The bush 52 has a flange 58 which permits an open communication 59 of the storage chamber 56 with the outside of the bearing. The chamber 56 is formed in the thickened part of the shaft which has an annular element 60. The operation of this bearing will be obvious after understanding the previous embodiments described; a sufficient quantity of lubricant is always supplied in the gap between the bearing surfaces 53 and 54.

FIG. 6 finally, shows an embodiment in which the storage chamber 66 is provided as a circumferential groove in the rotatable shaft 61. The storage chamber 66 for the lubricant 67 is in open communication with the outside of the bearing through the bores 70 and 71. The lubricant 67 which is forced in the direction of the bush 62 as a result of the centrifugal force is transported, if necessary, to the gap between the bearing surfaces 63 and 64 by means of helical transport grooves 69. Helical grooves 68 serve as a seal to prevent leakage of lubricant to the outside.

What is claimed is:

1. A bearing comprising a shaft and a bush, said shaft being a stationary bearing member having a bearing surface and said bush forming a rotatable member having a cooperating bearing surface with the bearing surface of the stationary bearing member, a storage chamber for a lubricant provided within said rotatable bearing member, said lubricant being forced in a direction remote from the shaft upon rotation of said bush as a result of the influence of centrifugal force, a flange provided on said bush forming one side of said storage chamber and located remote from the bearing surfaces, said flange extending to a point near the surface of said shaft and permitting open communication between said storage chamber and the outside of said bearing, a flange-shaped part provided on said shaft forming the other side of said storage chamber, and a pattern of spiral grooves provided between said flange-shaped part and the surface of the bush opposite thereto for forcing lubricant in the direction of the cooperating bearing surfaces upon rotation of said bush.

2. The bearing according to claim 1 wherein said pattern of spiral grooves is provided on said flange-shaped part.

3. The bearing according to claim 1 wherein said pattern of said spiral grooves is provided on the surface of the bush opposite said flange-shaped part provided on said shaft.

4. A bearing comprising a shaft forming a stationary bearing member having a bearing surface and a bush forming a rotatable bearing member having a cooperating bearing surface with the bearing surface of the stationary bearing member, a storage chamber for a lubricant provided in said rotatable bush, said lubricant being forced in a direction remote from the shaft upon rotation of the bush as a result of centrifugal forces, a first flange carried by said bush forming one side of said storage chamber remote from the bearing surfaces and extending to a point near the surface of said shaft and providing an open communication between said storage chamber at a point adjacent said shaft and the outside of said bearing, a flange-shaped part carried by said shaft, a second flange carried by said bush adjacent the flange-shaped part carried by said shaft and forming the other side of said storage chamber, at least one aperture provided in said second flange at a place remote from said shaft for passing the lubricant to the bearing surfaces, and a pattern of spiral grooves provided between said flange-shaped part and a surface of the bush located opposite said part for forcing the lubricant in the direction of the cooperating bearing surfaces upon rotation of the bush member.

5. The bearing according to claim 4 wherein said pattern of spiral grooves is provided on said flange-shaped part carried by said shaft.

6. The bearing according to claim 4 wherein said pattern of spiral grooves is provided on the surface of the bush which is located opposite said flange-shaped part.

7. A bearing comprising a shaft forming a stationary bearing member having a bearing surface and a bush forming a rotatable bearing member having a cooperating bearing surface with the bearing surface of the stationary bearing member, a storage chamber for a lubricant provided in said rotatable bush, said lubricant being forced in a direction remote from the shaft upon rotation of the bush as a result of centrifugal forces, a first flange carried by said bush forming one side of said storage chamber remote from the bearing surfaces and extending to a point near the surface of said shaft and providing an open communication between said storage chamber at a point adjacent said shaft and the outside of said bearing, a flange-shaped part carried by said shaft, a second flange carried by said bush adjacent the flange-shaped part carried by said shaft and forming the other side of said storage chamber, and at least one aperture provided in said second flange at a place remote from said shaft for passing the lubricant to the bearing surfaces upon rotation of the bush member.

* * * * *